United States Patent
Jung et al.

(10) Patent No.: US 7,698,048 B2
(45) Date of Patent: Apr. 13, 2010

(54) POWER ENRICHMENT SCHEDULING FOR COORDINATED TORQUE CONTROL SYSTEM

(75) Inventors: Jaehak Jung, Pittsford, NY (US); Louis A. Avallone, Milford, MI (US); Christopher E. Whitney, Highland, MI (US); Leonard G. Wozniak, Ann Arbor, MI (US); Klaus Pochner, Russeisheim (DE); Jeffrey M. Kaiser, Highland, MI (US)

(73) Assignee: GM Global Technology Operations, Inc.

( * ) Notice: Subject to any disclaimer, the term of this patent is extended or adjusted under 35 U.S.C. 154(b) by 61 days.

(21) Appl. No.: 12/184,290

(22) Filed: Aug. 1, 2008

(65) Prior Publication Data
US 2009/0037073 A1 Feb. 5, 2009

Related U.S. Application Data

(60) Provisional application No. 60/962,790, filed on Aug. 1, 2007.

(51) Int. Cl.
*G06F 19/00* (2006.01)

(52) U.S. Cl. .................. 701/103; 701/54; 701/102; 477/120

(58) Field of Classification Search .............. 701/103, 701/102, 101, 114, 115, 54, 53, 84; 477/120, 477/121, 129
See application file for complete search history.

(56) References Cited

U.S. PATENT DOCUMENTS

| 6,827,070 | B2* | 12/2004 | Fehl et al. ............... 123/682 |
| 7,021,282 | B1 | 4/2006 | Livshiz et al. |
| 7,254,472 | B2* | 8/2007 | Larsen et al. ............. 701/54 |

* cited by examiner

*Primary Examiner*—Hieu T Vo

(57) ABSTRACT

A control system for an engine of a vehicle includes a requested torque module that determines a first requested torque based on an accelerator pedal position and a current engine torque output capacity. An accelerator effective position module determines an accelerator effective position based on a requested driver axle torque request signal. A power enrichment (PE) module enables a PE mode to provide a richer than stoichiometric fuel equivalence ratio based on the first requested torque and the accelerator effective position.

20 Claims, 7 Drawing Sheets

US 7,698,048 B2

POWER ENRICHMENT SCHEDULING FOR COORDINATED TORQUE CONTROL SYSTEM

CROSS-REFERENCE TO RELATED APPLICATIONS

This application claims the benefit of U.S. Provisional Application No. 60/962,790, filed on Aug. 1, 2007. The disclosure of the above application is incorporated herein by reference.

FIELD OF THE INVENTION

The present invention relates to engine control systems and more particularly to power enrichment during coordinated torque control.

BACKGROUND OF THE INVENTION

The statements in this section merely provide background information related to the present disclosure and may not constitute prior art.

An engine combusts an air/fuel mixture to produce drive torque. A richer or leaner air/fuel ratio may be provided by adjusting, for example, position of an intake air control throttle or an amount fuel that is injected into cylinders of the engine during each combustion cycle. During certain conditions a richer air/fuel ratio is desired to provide increased output torque. This can occur based on power enrichment (PE) scheduling.

PE scheduling is generally initiated when an engine is under high load to provide additional torque output. During a PE mode, an engine control system commands a richer than stoichiometric fuel equivalence ratio (FEQR). FEQR refers to a current fuel-to-oxidizer ratio divided by a stoichiometric fuel-to-oxidizer ratio. A stoichiometric FEQR is equal to one (1). The richer FEQR (ex. FEQR >1) increases engine output torque. In airflow based engine control systems, PE scheduling may be based on actual throttle position and air pressure within an intake manifold of an engine.

SUMMARY OF THE INVENTION

In one embodiment, a control system for an engine of a vehicle is provided that includes a requested torque module. The requested torque module determines a first requested torque based on an accelerator pedal position and a current engine torque output capacity. An accelerator effective position module determines an accelerator effective position based on a resultant driver axle torque request signal. A power enrichment (PE) module enables a PE mode to provide a richer than stoichiometric fuel equivalence ratio based on the first requested torque and the accelerator effective position.

In other features, a method of operating a coordinated torque control system is provided and includes determining a first requested torque based on an accelerator pedal position and a current engine torque output capacity. An accelerator effective position is determined based on a resultant driver axle torque request signal. A PE mode is enabled to provide a richer than stoichiometric fuel equivalence ratio based on the first requested torque and the accelerator effective position. Coordinated torque control is provided based on the enabling of the PE mode.

In other features, a control system for an engine of a vehicle is provided and includes a requested torque module. The requested torque control module determines a first requested torque based on an accelerator pedal position and a current engine torque output capacity. An accelerator effective position module determines an accelerator effective position based on the first requested torque and a second requested torque from a cruise control system. A PE module enables a PE mode to provide a richer than stoichiometric fuel equivalence ratio based on the first requested torque and the accelerator effective position. A coordinated torque control module controls operation of one or more devices including a throttle based on the accelerator effective position and a throttle position signal while in the PE mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
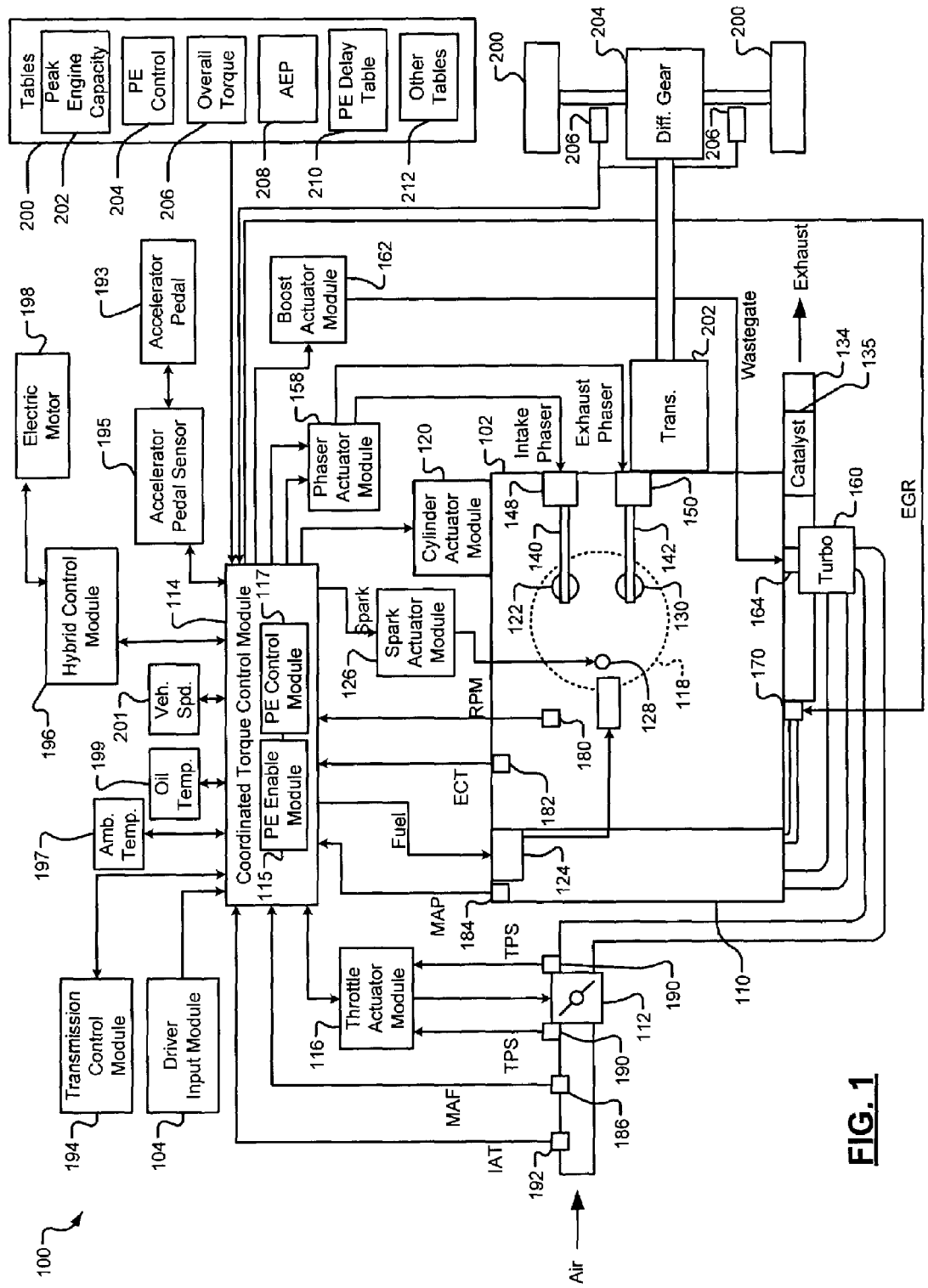
FIG. 1 is a schematic illustration of an exemplary coordinated torque control system according to an embodiment of the present disclosure.

Coordinated torque control (CTC) systems have been developed to accurately control engine output torque. An example torque control system is disclosed in commonly assigned U.S. Pat. No. 7,021,282 ("Coordinated Engine Torque Control"), which is herein incorporated by reference in its entirety. CTC systems provide a rapid response to control signals and coordinate engine torque control based on various devices that affect engine torque output.

A CTC system generates a throttle control signal based on an engine torque request and a throttle position signal generated by a throttle position sensor (TPS). The engine torque request may be based on a vehicle operator input, such as an accelerator pedal position. The CTC system commands one or more devices based on the engine torque request and the throttle position signal. The devices may include a camshaft phasor, an exhaust gas recirculation (EGR) valve, a turbo, etc. The CTC system may regulate operation of the devices to provide a desired output torque.

The embodiments disclosed herein include the enablement of power enrichment (PE) mode(s) in a CTC system. PE scheduling has traditionally been applied to airflow based systems (non-CTC systems). In non-CTC systems, PE scheduling has been based on actual throttle position and engine manifold pressure. There are several disadvantages associated with PE scheduling in a CTC system based on actual throttle position and engine manifold pressure.

In torque-based control, throttle area may be determined based on the engine torque request and may be based on a fueled equivalence ratio. The throttle may be positioned based on the determined throttle area. Since the throttle area is determined based on the fuel equivalence ratio (FEQR) and since the FEQR is dependent upon the throttle area, a circular dependency arises. For this reason, PE scheduling as provided in the embodiments described herein is not dependent upon throttle position.

In a CTC system, a throttle may open to an un-throttled position, which is substantially less than 100% at a low engine speed, for a 100% engine torque request. In certain circumstances, further opening of a throttle may not provide additional output torque. For example, at a low engine speed, such as between 1000-2000 revolutions-per-minute (rpm), to open a throttle further than a predetermined angle does not provide additional torque. As a result, in a CTC system, throttle position may not be directly related to an accelerator pedal position. In a CTC system, a control module determines and sets a throttle position to provide a requested output torque. The determined throttle position may correspond with a partially or substantially closed position (<100% a fully open position) although the accelerator pedal is fully pressed or in a 100% depressed state.

If PE scheduling were based on throttle position, a PE mode may not be triggered when a vehicle operator requests 100% axel torque, for example, when an accelerator pedal is depressed 100%. Also, when a vehicle operator requests 50% axle torque, approximately 50% accelerator pedal position, engine torque may reach 100% due to a transmission being in a high gear (ex. 5th or 6th gear). This can result in frequent PE operation if PE scheduling is based on throttle position or requested engine torque alone. The excessive PE operation may lead to a decrease in fuel economy and an increase in emissions. Therefore, another form of driver intent, such as pedal position, may be used.

The embodiments disclosed herein provide PE scheduling based on pedal position. In so doing, a circular dependency does not arise and a more accurate estimate of a requested engine output torque is determined. PE may be enabled during instances other than when a vehicle operator requests more torque than an engine is able to provide during stoichiometric combustion.

For example and to account for controller based torque requests, as opposed to operator based torque requests, the embodiments disclosed herein provide PE scheduling based on an accelerator effective position. The accelerator effective position is determined based on a commanded output torque, such as from a cruise control system. During cruise control operation, a vehicle operator may not press on the accelerator pedal. Although the pedal position may be at 0%, PE may be desired, such as when pulling a heavy load (ex. A boat), to maintain a desired vehicle speed.

The following description of the preferred embodiments is merely exemplary in nature and is in no way intended to limit the invention, its application, or uses. For purposes of clarity, the same reference numbers will be used in the drawings to identify the same elements.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, and spark assisted compression ignition engines.

In the below-described embodiments, displacement on demand and/or cylinder deactivation may refer to the disabling of spark and/or fuel injection into a cylinder. When a cylinder is disabled spark and/or fuel may be disabled for that cylinder. This prevents combustion within that cylinder. The disabling of a cylinder may also or alternatively include retarding spark of a cylinder. Retarding spark refers to a delay in spark timing such that spark for a cylinder occurs before top-dead-center (TDC).

Referring now to FIG. 1, a functional block diagram of a CTC system 100 is presented. The CTC system 100 may be configured for a hybrid electric vehicle. The CTC system 100 includes an engine 102 that combusts an air/fuel mixture to produce drive torque for a vehicle based on a driver input module 104. Air is drawn into an intake manifold 110 through a throttle valve 112. A main control module 114 commands a throttle actuator module 116 to regulate opening of the throttle valve 112 to control the amount of air drawn into the intake manifold 110.

The CTC module 114 includes a power enrichment (PE) enable module 115 and a PE control Module 117. The PE enable module 115 enables power enrichment (activates a power enrichment mode) based on various parameters described herein. The PE control module 117 provides power enrichment based on a PE enable signal from the PE enable module 115. Another example CTC system is shown and described with respect to the embodiments of FIGS. 4A and 4B. The CTC system 10 and/or the CTC module 114 of FIG. 1 may include one or more of the modules of FIGS. 4A and 4B. The PE modules 115, 117 may be in communication with and operate based on signals from any of the modules of FIGS. 4A and 4B.

Air from the intake manifold 110 is drawn into cylinders of the engine 102. The engine 102 may include any number of cylinders. The CTC module 114 may instruct a cylinder actuator module 120 to selectively deactivate some of the cylinders to improve fuel economy.

Air from the intake manifold 110 is drawn into the cylinder 118 through an intake valve 122. The CTC module 114 controls the amount of fuel injected by a fuel injection system 124 that includes one or more fuel injectors 125. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders, as shown.

The injected fuel mixes with the air and creates the air/fuel mixture in the cylinder 118. A piston (not shown) within the cylinder 118 compresses the air/fuel mixture. Based upon a signal from the CTC module 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. Exhaust passes through a catalyst 135.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

During a power enrichment (PE) mode, a CTC module 114 may regulate the position of the intake valve 122 and/or the exhaust valve 130 to increase the quantity of fuel ingested into the cylinder(s) 118. The CTC module 114 may also adjust operation of the fuel injector(s) 125, such as ON time or size of injector openings, to increase the amount of fuel injected into the cylinder(s) 118. The CTC module 114 may also adjust the timing of the exhaust camshaft(s) corresponding to the change in the A/F mixture.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The CTC system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The CTC module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The CTC system 100 may include an exhaust gas recirculation (EGR) valve 170, which selectively redirects exhaust gas back to the intake manifold 110. In various implementations, the EGR valve 170 may be located after the turbocharger 160. The CTC system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the CTC system 100 may be measured using an intake air temperature (IAT) sensor 192. The CTC module 114 may use signals from the sensors to make control decisions for the CTC system 100.

The CTC module 114 may communicate with a transmission control module 194 to coordinate shifting gears in a transmission (not shown). For example, the main control module 114 may reduce torque during a gear shift. The CTC module 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the CTC module 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

While electric motor 198 may provide torque in series and/or in parallel with the torque output of engine 102, it should be appreciated that other configurations are also contemplated to be within the scope of this description. For example, electric motor 198 may be implemented as one or more electric motors that provide torque directly to wheels 200 instead of passing through a transmission 202.

The combined torque of engine 102 and electric motor 198 is applied to an input of transmission 202. Transmission 202 may be an automatic transmission that switches gears in accordance with a gear change command from the CTC module 114. An output shaft of transmission 202 is coupled to an input of a differential gear 204. Differential gear 204 drives axles and wheels 200. Wheel speed sensors 206 generate signals that indicate a rotation speed of their respective wheels 200.

The CTC module 114 estimates an engine output torque to provide based on received sensor signals and other parameters described herein. The CTC module 114 may adjust position of the throttle, air-fuel ratio, valve timing, fuel injection, etc. to provide the estimated engine output torque. Based on a desired engine output torque, the CTC module 114 controls engine devices such that a desired air flow, a desired fuel injection, and/or a desired spark timing is achieved. The desired engine output torque may be based on a vehicle operator (driver) request and/or may be controller based, such as a torque output request from a cruise control system. In particular, the CTC module 114 controls the torque output of the engine based on the coordinated torque control methods and systems of the present disclosure.

The sensor signals that are received by the CTC module 114 and which may be used by the PE enable module 115 and the PE control module 117 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 198, and a vehicle speed sensor 201.

The CTC module 114 communicates with the throttle actuator module 116 and a cruise control module. An example of a cruise control module is shown and described with respect to the embodiment of FIG. 4A. The CTC module 114 receives a throttle position signal from the throttle position sensor 190 and adjusts throttle position based on the throttle position signal. The CTC module 114 may control the throttle 112 using a throttle actuator based on a position of an accelerator pedal 193. The throttle actuator module 116 may include a motor or a stepper motor, which provides limited and/or coarse control of the throttle position.

The CTC module 114 may also control the throttle 112 using the throttle actuator based on input from the cruise control module, such as an axle torque request. The CTC module 114 also generates an effective pedal position signal, which represents a throttle position regardless of whether the vehicle operator is depressing the accelerator pedal 194 or the cruise control module is controlling the amount of throttle.

Air mass, volume, and pressure per cylinder may be determined and/or estimated based on signals from the sensors 184, 186. The CTC control module 114 may determine a throttle area based on a desired MAP and a desired MAF, and may generate a control signal to control the throttle based on the throttle area. The desired MAP and MAF may be determined based on engine speed and torque request signals.

The CTC system 10 may also include various tables 200, which may be used when performing arbitration, as described herein. The tables may include a peak engine capacity table 202, a PE control table 204, an overall torque table 206, an accelerator effective position (AEP) table 208, a PE delay table 210, and other tables 212. The peak engine capacity table 202 may for example relate maximum engine output torque to engine speed. The PE control table may relate air/fuel ratios to engine speed and air per engine cylinder. The overall torque table 206 may relate accelerator effective positions and/or resultant estimated torques to one or more various torque requests, such as driver-based and control module-based torque requests. The AEP table 208 may relate effective throttle plate positions to resultant estimated torques and/or accelerator effective positions. The PE delay table 210 may relate delay times to engine speed and effective throttle area.

Figure 2:
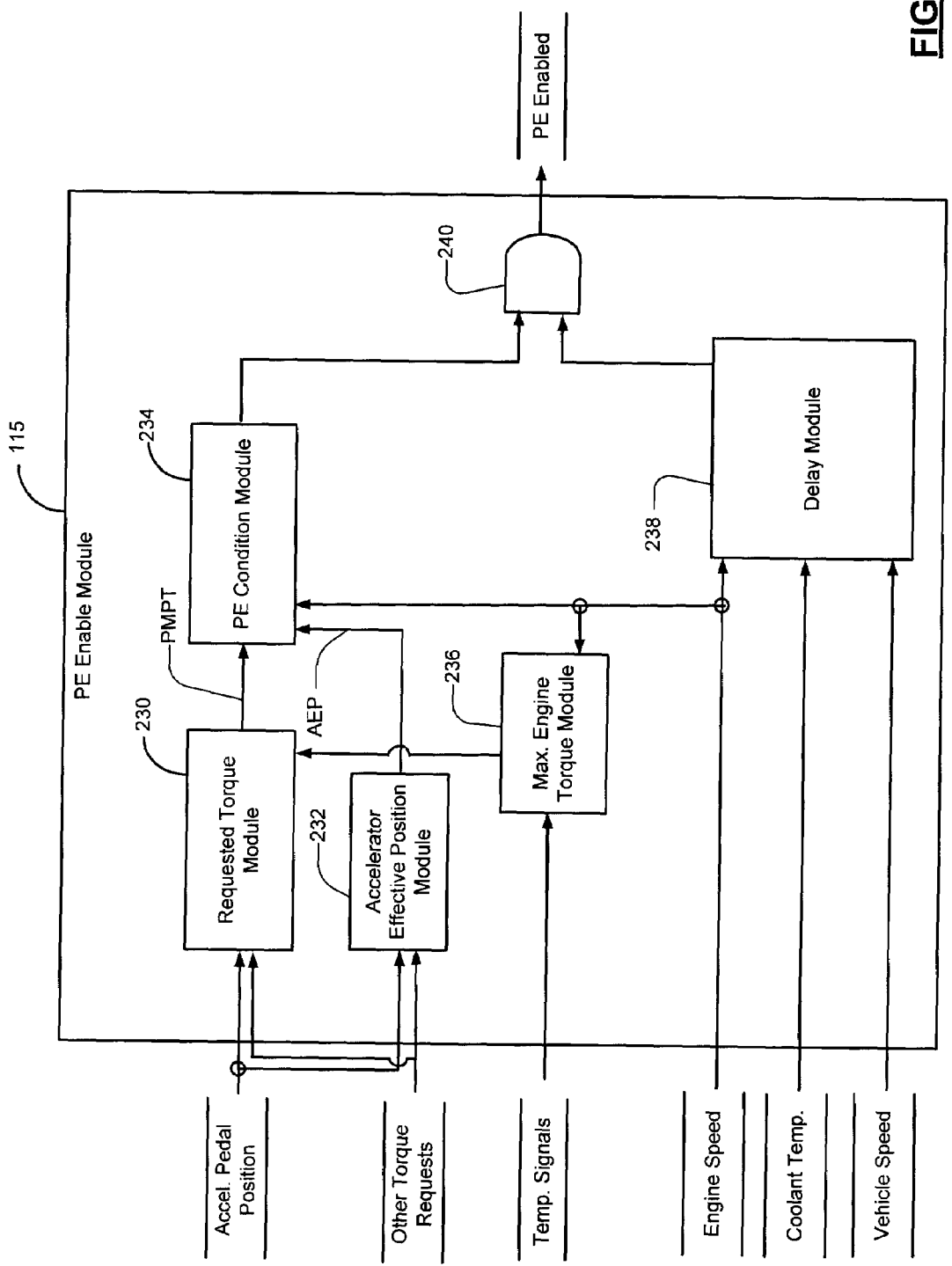
FIG. 2 is a functional block diagram of a power enrichment enable module according to an embodiment of the present disclosure.

Referring now also to FIG. 2, a functional block diagram of the PE enable module 115 is shown. The PE enable module 115 includes a requested torque module 230, an accelerator effective position module 232, a PE condition module 234, a maximum engine torque module 236 and a delay module 238.

The requested torque module 230 receives a pedal position signal. The pedal position signal may be generated by the pedal position sensor 195.

The requested torque module 230 generates a driver-based torque requested signal $T_{DREQ}$ based on the pedal position and a resultant driver axle torque request $T_{RDATR}$. The requested torque module 230 determines a percent maximum driver predicted torque PMPT based on the driver-based torque request signal $T_{DREQ}$ and the resultant driver axle torque request $T_{RDATR}$. The resultant driver axle torque request $T_{RDATR}$ is based on the driver-based torque request signal $T_{DREQ}$ and other axle and/or engine torque requests. In one embodiment, the other axle and/or engine torque requests are driver torque requests, such as that associated with cruise control, PTO and a speed limiter. PE scheduling by the CTC module 114 and/or the PE enable module 115 may be based on a percentage of engine torque requested compared to a maximum engine capacity for a current engine speed. An example of PMPT is provided by equation 1.

$$PMPT = \frac{T_{RDATR}}{PeakTorque} \quad (1)$$

The maximum engine torque module 236 may provide the peak torque value. The maximum engine torque module 236 determines a maximum engine output torque based on a current engine speed and various temperature signals, such as ambient temperature, engine oil temperature, engine coolant temperature, etc.

The accelerator effective position module 232 generates an accelerator effective position signal AEP that represents a throttle position for a desired output torque. The accelerator effective position module 232 may receive torque request other that the accelerator pedal position, as shown. The accelerator effective position signal AEP is based on driver axle torque requests. The accelerator effective position signal AEP may be based on controller-based torque request signals, such as from a cruise control system, which controls vehicle speed. The accelerator effective position signal AEP may be based on power take-off (PTO), which controls engine speed. When in a PTO mode, vehicle speed may vary, but engine speed is maintained at a constant selected level. In one embodiment, the accelerator effective position signal AEP is not based on the maximum predicted torque PMPT. In another embodiment, the accelerator effective position is not determined based on drag or transmission torque requests.

As an example, accelerator pedal position is translated to an axle torque. An accelerator pedal position axle torque request is arbitrated against other driver axle torque requests, such as a cruise control request, a PTO request, and a speed limiter request. A speed limit may be set to limit the speed of the vehicle and or engine. A resultant arbitrated driver axle torque request is translated back to an accelerator effective position signal AEP through an inverse of the above translation. In other words, a resultant driver axle torque request is used to determine an accelerator effective position by determining an accelerator pedal position based on an axle torque.

An example accelerator effective position signal AEP is provided by equation 2, where the requested accelerator pedal position corresponds with the resultant arbitrated driver axle torque request. The maximum accelerator pedal position may be a predetermined accelerator pedal position angle corresponding to a fully open state.

$$AEP = \frac{RequestedAcceleratorPedalPosition}{MaxAcceleratorPedalPosition} \quad (2)$$

A pedal may have a first 0-100% positioning range, where 0% refers to an undepressed state and 100% refers to a fully depressed state. An accelerator effective position may be generated to represent requested torque, which may correspond with a position of the pedal. The throttle may have a second positioning range and may be in a fully open or a partially open position, such as during idle conditions. An unthrottled position is a lowest position or lowest angular position for a give engine speed where air pressure on each side of the throttle is equal. In other words, when the throttle inlet air pressure (TIAP) is equal to the MAP. The percentage of the accelerator effective position may be less, equal to or greater than the corresponding percentage of pedal depression depending upon the operating conditions. The accelerator effective position may be used instead of a relationship between throttle position and pedal position. This allows PE to be enabled in a cruise control mode although an accelerator pedal is not depressed.

The PE condition module 234 generates a first enable signal based on the outputs of the requested torque module and the accelerator effective position module 232. The PE condition module 234 generates a first enable signal based engine speed, activation of displacement on demand and/or cylinder deactivation, and activation of an alcohol-based fuel supply mode.

The delay module 238 may delay power enrichment when certain conditions exist. The delay module may generate a second PE enable signal based on the first PE enable signal, a current engine speed, a current engine coolant temperature, and a current vehicle speed. The outputs of the PE condition module 234 and the delay module 238 may be provided to an AND gate 240. The AND gate 240 generates a third PE enable signal that may be used to initiate power enrichment.

Figure 3:
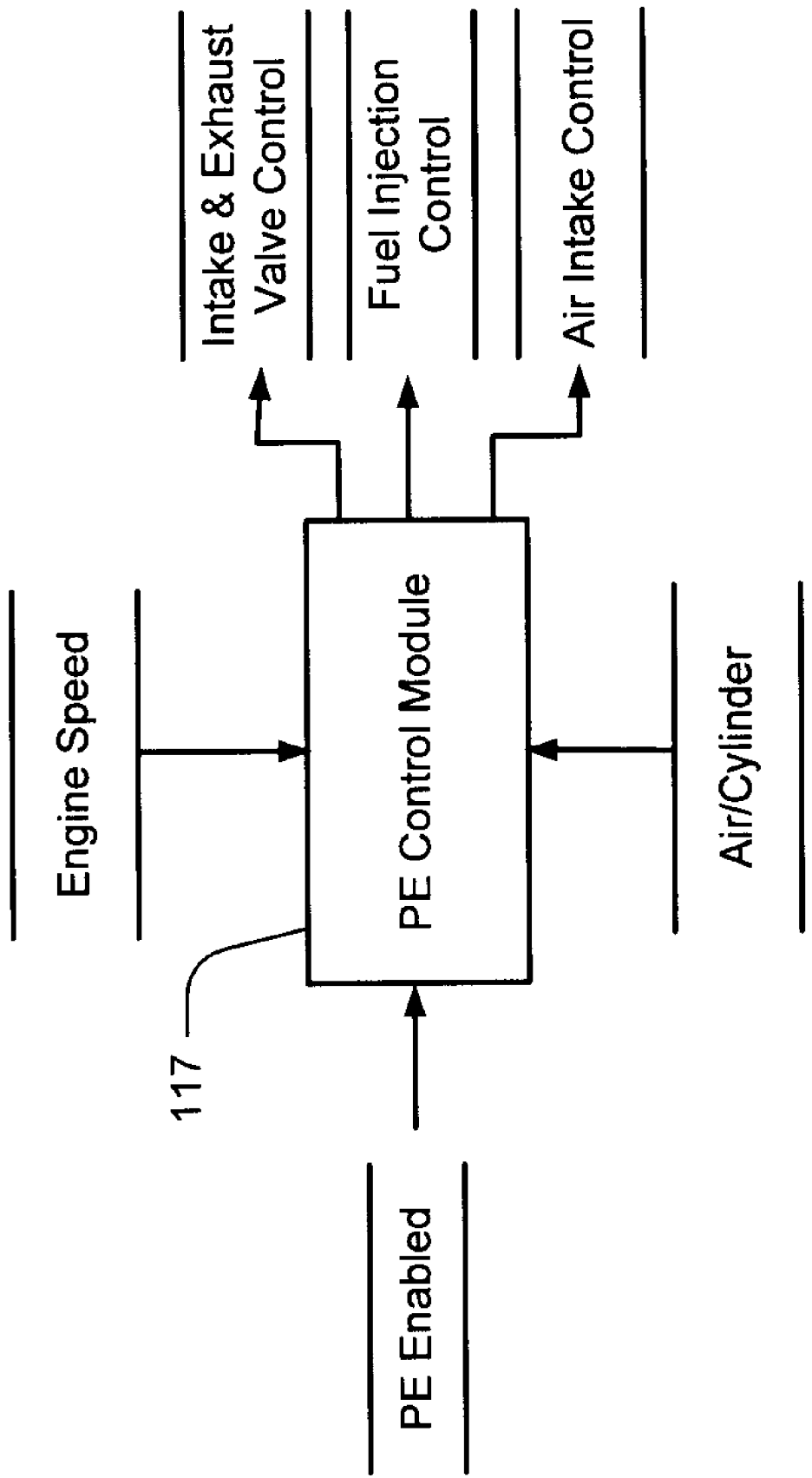
FIG. 3 is a functional block diagram of a power enrichment control module according to an embodiment of the present disclosure.

Referring now to FIG. 3, a PE control module 117 is shown. The PE control module 117 may enable and control power enrichment based on one or more of the above-described PE enable signals, engine speed, and air per cylinder of an engine. The power enrichment control may include adjustment in intake and exhaust vale positioning, fuel injection, and the amount of air received per cylinder. The intake and exhaust position may include, for example, an increase in intake valve displacement to increase the amount of air and/or fuel entering a cylinder. The amount of air receive by a cylinder may be adjusted via a throttle, a turbo, a supercharger, etc. To provide a richer than stoichiometric fuel equivalence ratio, the ratio of fuel to air is increased. The amount of entering a cylinder may be increased or held constant and the amount of air entering the cylinder may be increased, held constant or decreased during a PE mode.

Figure 4A:
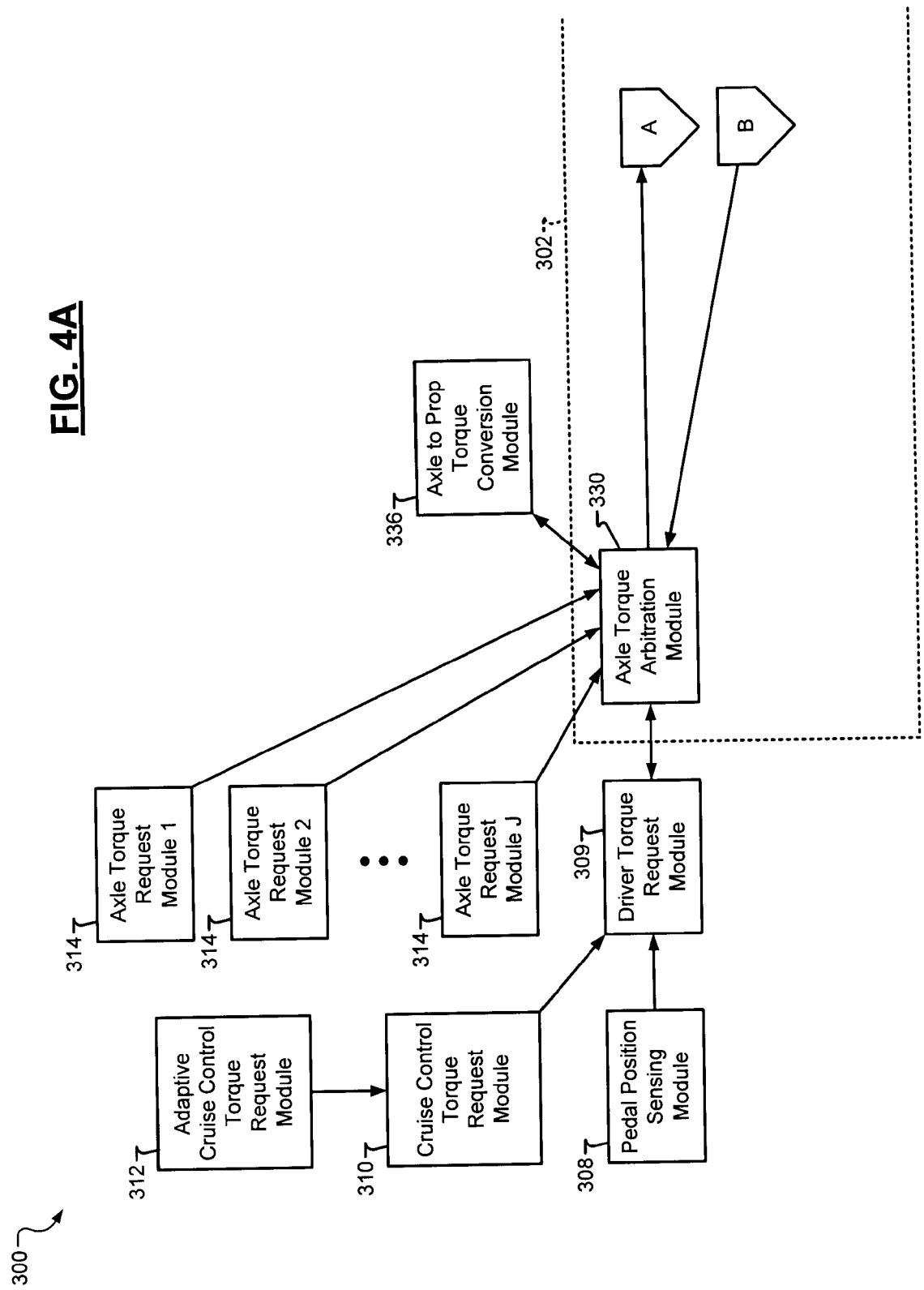
FIG. 4A is a functional block diagram of an exemplary engine control system according to the principles of the present disclosure.
Figure 4B:
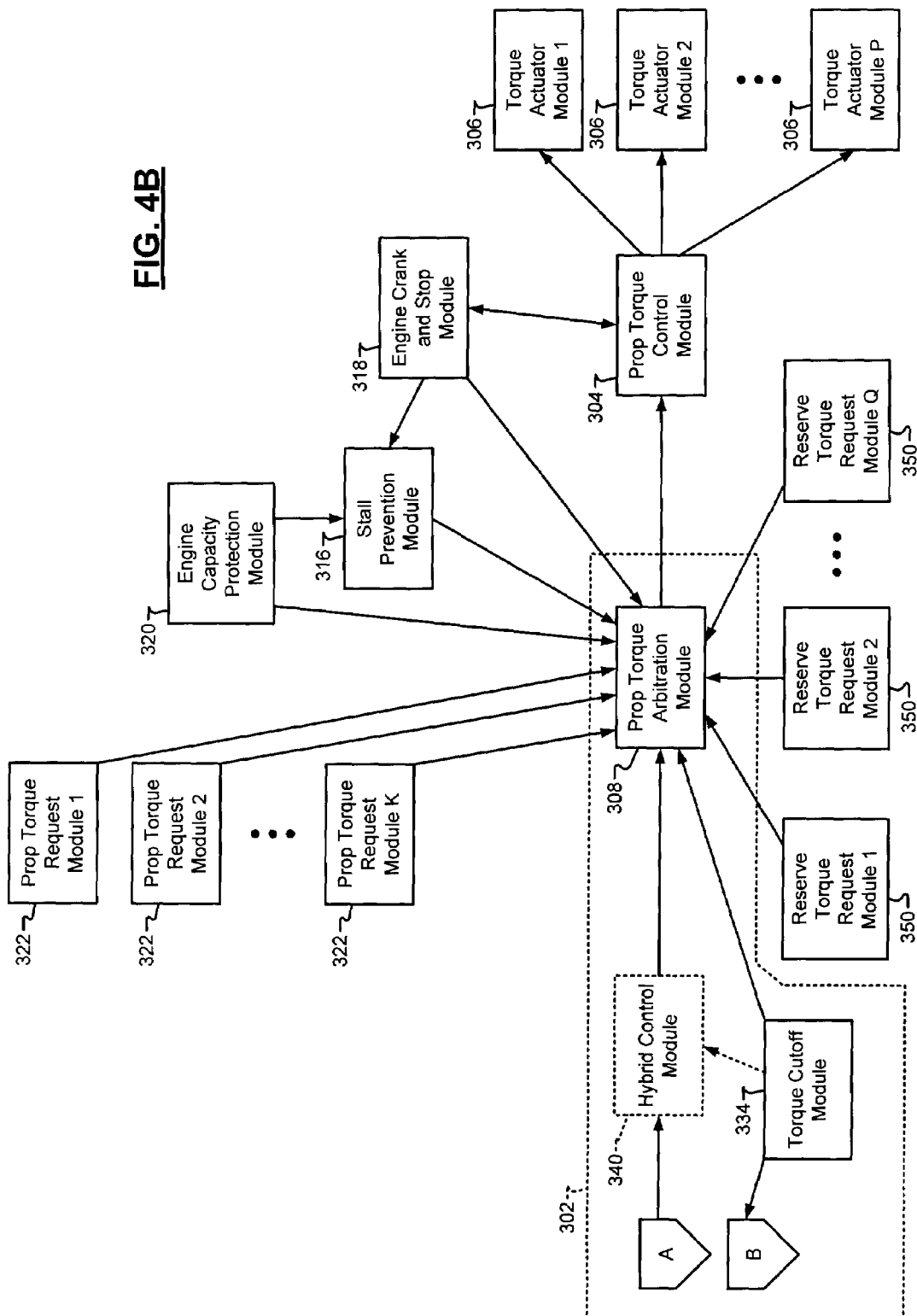
FIG. 4B is a continuation of the functional block diagram of FIG. 5A.

Referring now to FIGS. 4A and 4B, an exemplary engine control system 300 that provides coordinated torque control is shown. The engine control system 300 may be referred to as a CTC system or backbone. Any of the modules of the engine control system 300 may perform a diagnostic test and thus be referred to as a dedicated diagnostic module. FIGS. 4A and 4B join together to depict the complete functional block diagram. A first connector label "A" on FIG. 4A overlays a second connector label "A" on FIG. 5B. A first connector label "B" on FIG. 4A overlays a second connector label "B" on FIG. 4B. FIGS. 4A and 4B are collectively referred to as FIG. 4.

The engine control system 300 employs a torque request backbone module 302 that determines a propulsion torque demand and communicates the propulsion torque demand to a propulsion torque control module 304. Torque request backbone module 302 determines the propulsion torque demand based on inputs from various torque requesting modules 308-322 that are described below in more detail. The torque requesting modules 308-322 include modules that generate signals to affect the control of one or more of torque actuator modules $306_{1-P}$, which alter engine torque. The propulsion torque demand represents the torque desired from an engine in order to satisfy requests from the torque requesting modules 308-322.

The propulsion torque control module 304 controls one or more of the torque actuator modules 306 based on the net propulsion torque demand. The torque actuator modules 306 affect the engine torque. Examples of the torque actuator modules 306 include: an ignition module that delivers an ignition spark to the engine according to a set ignition timing; a fuel injection module that delivers an appropriate amount of fuel to the engine at a set time and controls PE; and an electronic throttle control module that adjusts, for example, a throttle valve angle.

The fuel injection module or fuel ring is in communication with the propulsion torque arbitration module 308 via the propulsion torque control module 304 for determination of a torque request percentage. The fuel injection module is in communication with the driver torque request module 309 via the axle torque arbitration module 330 and the propulsion torque arbitration module 308 for determination of an accelerator effective position.

Each of the torque requesting modules 308-322 may be categorized as either an axle torque requesting module or a propulsion torque requesting module. Axle torque requesting modules control at least one of vehicle speed and vehicle traction with the road surface. Propulsion torque requesting modules control the output torque of the engine and an electric motor. Example axle torque requesting modules are shown in FIG. 4A and include a pedal position sensing module 308, a driver torque request module 309, a cruise control torque request module 310, an adaptive cruise control torque request control module 312, and other axle toque request modules $314_{1-J}$. Example propulsion torque requesting modules 304 are shown in FIG. 4B and include a stall prevention module 316, an engine crank and stop module 318, an engine capacity protection module 320, and other propulsion torque request modules$_{1-K}$.

The pedal position sensing module 308 generates a pedal position signal that indicates a vehicle acceleration requested by a vehicle operator. The driver torque request module 309 generates a driver torque request based on the pedal position signal. The driver torque request may also be based on a current engine speed and a current vehicle speed. The driver torque request module 309 performs a pedal to axle torque translation, arbitration against driver axle torque requests, determination of accelerator effective position, and "clunk" zone shaping.

Clunk zone shaping may refer to a transition period between significant increases or decreases in torque or during a torque reversal. An example of a torque reversal occurs during regenerative braking. Regenerative braking can cause a sudden torque reversal in a traction drive system. Accordingly, and since there is a significant amount of backlash in the series of gears and couplings connecting the electric motors to the drive wheels, this torque reversal causes a disturbance known as "driveline clunk". A control approach may be used to provide a smooth transition into regenerative braking to prevent or minimize the dynamics associated with the backlash.

The cruise control torque request module 310 generates a cruise control torque request. The cruise control torque request represents an axle torque to maintain the vehicle at a set speed. The adaptive cruise control torque request module 312 may communicate with cruise control torque request module 310 to modify the cruise control torque request based on the environment surrounding the vehicle. For example, adaptive cruise control torque request module 312 may request a reduced axle torque. This request may be to decelerate the vehicle and/or maintain the vehicle at a minimum following distance behind a second vehicle while the cruise control is active.

Other axle torque requesting modules are represented by axle torque request modules $314_{1-J}$ are referred to collectively as axle torque request modules 314. A first example of an axle torque request module 314 is a traction/drag control module. The traction/drag control module determines axle torque changes to control positive wheel slip and negative wheel slip. Positive wheel slip refers to slip between a vehicle tire and a road surface due to excessive powertrain torque during acceleration. Negative wheel slip refers to slip between the vehicle tire and the road surface due to excessive braking axle torque during deceleration. The slip can be detected based on signals from wheel speed sensors.

Another example of an axle torque request module 314 is a vehicle over-speed protection module. The vehicle over-speed protection module determines a maximum axle torque limit to maintain vehicle speed below a predetermined speed limit.

Still another example of an axle torque request module 314 is a brake torque management module. The brake torque management module determines a maximum axle torque when vehicle brakes are applied. The maximum axle torque is the axle torque that can be provided without overcoming the brake torque of the vehicle brakes.

Yet another example of an axle torque request module 314 is a stability control module. The stability control module generates axle torque requests based on a yaw rate of the vehicle. A stability control module may be included in an electronic stability control system.

The torque request backbone module 302 includes an axle torque arbitration module 330 and a propulsion torque arbitration module 332. The axle torque arbitration module 330 receives the various torque requests and/or limits from driver torque request module 309, cruise control torque request module 310, axle torque request modules 314, and a torque cutoff control module 334 (shown in FIG. 4B).

In certain situations propulsion torque is minimized by momentarily turning off fuel and/or spark to an engine. The torque cutoff module 334 may be used to generate the torque requests for these situations, which can include at least one of a clutch fuel cutoff and a deceleration fuel cutoff. A clutch fuel cutoff occurs when the vehicle is equipped with a manual transmission and the vehicle operator disengages the clutch. The clutch fuel cutoff prevents the engine speed from increasing beyond a predetermined speed when the clutch disengages and removes a load from the engine. The deceleration fuel cutoff occurs when the vehicle is coasting above a predetermined speed. The deceleration fuel cutoff helps increase engine braking. Deceleration fuel cutoffs are also communicated to the axle torque arbitration module 330.

The axle torque arbitration module 330 generates a net axle torque request based on the torque requests and/or limits and communicates the net axle torque request to an axle-to-propulsion torque conversion module 336. Axle-to-propulsion torque conversion module 336 converts the net axle torque request to a corresponding propulsion torque request, which may be provided to the propulsion torque arbitration module 332. The conversion may be based on a gear ratio of an axle differential gear, a diameter of a vehicle wheel, a gear ratio of a transmission, and a torque converter gain.

The axle torque arbitration module 330 may be configured for a hybrid electric vehicle. In a hybrid electric vehicle, the total axle torque request from the axle torque arbitration module 330 is communicated to a hybrid control module 340. The hybrid control module 340 may determine the amounts of propulsion torque to be provided by an electric motor and an engine. The hybrid control module 340 generates propulsion torque requests signals based on the determination, which are provided respectively to the propulsion torque arbitration module 332 and the electric motor. The axle to propulsion torque conversion module 336 may be combined with the hybrid control module 340. Also, the torque cutoff module 334 may communicate deceleration fuel cutoff torque requests to the hybrid control module 340 instead of to the axle torque arbitration module 332.

The propulsion torque arbitration module 332 generates a total requested propulsion torque based on the propulsion torque requests and/or limits from the various propulsion torque request modules, the axle torque arbitration module 330, and/or the hybrid control module 340. The propulsion torque arbitration module 332 communicates the total requested propulsion torque to propulsion torque control module 304. The propulsion torque arbitration module 332 receives propulsion torque requests from the propulsion torque request modules 316-322. The propulsion torque request modules $322_{1-K}$ are referred to collectively as propulsion torque request modules 322.

The stall prevention module 316 determines a minimum torque needed to maintain the engine in a running state. The stall prevention module 316 may increase the minimum torque based on input from the engine crank and stop module 318 and the engine capacity protection module 320.

The engine crank and stop module 318 increases the minimum torque request based on whether the engine is a new or green engine. A green engine refers to an engine that uses a fuel injection pulse width to purge air from a fuel system when the vehicle is first assembled. The engine crank and stop module 318 may also communicate with the propulsion torque arbitration module 304 to retard ignition timing and maintain a constant engine torque despite the increased fuel injector pulse width.

The engine capacity protection module 320 provides a maximum torque limit for an engine based on mechanical limitations of a powertrain. Example mechanical limitations include a maximum torque limit of a transmission and a maximum temperature limit of an exhaust catalyst.

An example of a propulsion torque request module 322 is a transmission torque request module that generates a torque request to reduce engine torque during transmission shifts. Other propulsion torque request modules 322 may include an engine over-speed protection module and an engine idle speed control module. The engine over-speed protection module determines a propulsion torque limit to prevent engine speed from exceeding a predetermined engine speed. The engine idle speed control module determines the propulsion torque needed to maintain an engine at a predetermined idle speed during coasting or at idle with a transmission in a drive or neutral gear.

The propulsion torque arbitration module 332 may also receive reserve torque requests from one or more reserve torque request modules $350_{1-Q}$, which are referred to collectively as reserve torque request modules 350. Reserve additional torque that may be provided from an engine. A first example of a reserve torque request module 350 is an air conditioning compressor torque compensation module. The air conditioning compressor torque compensation module requests a reserve torque to maintain a constant engine speed when a compressor clutch engages and disengages.

Another example of a reserve torque request module 350 is a catalyst light-off module. When an engine is started and has a temperature that is less than a certain temperature, the catalyst light-off module requests engine spark to be retarded to increase exhaust gas temperature and heat an exhaust catalyst to a conversion temperature. The catalyst light-off module may also request that a throttle opening be increased while the spark is retarded to compensate for any associated torque loss.

Another example of a reserve torque request module 350 is an intrusive diagnostic module. An intrusive diagnostic module, such as an idle catalyst monitor, may change an air/fuel ratio of an engine to perform a diagnostic test. This change in the air/fuel ratio may alter torque output of an engine. The intrusive diagnostic module may request a reserve torque to compensate for this change in torque output.

Figure 5:
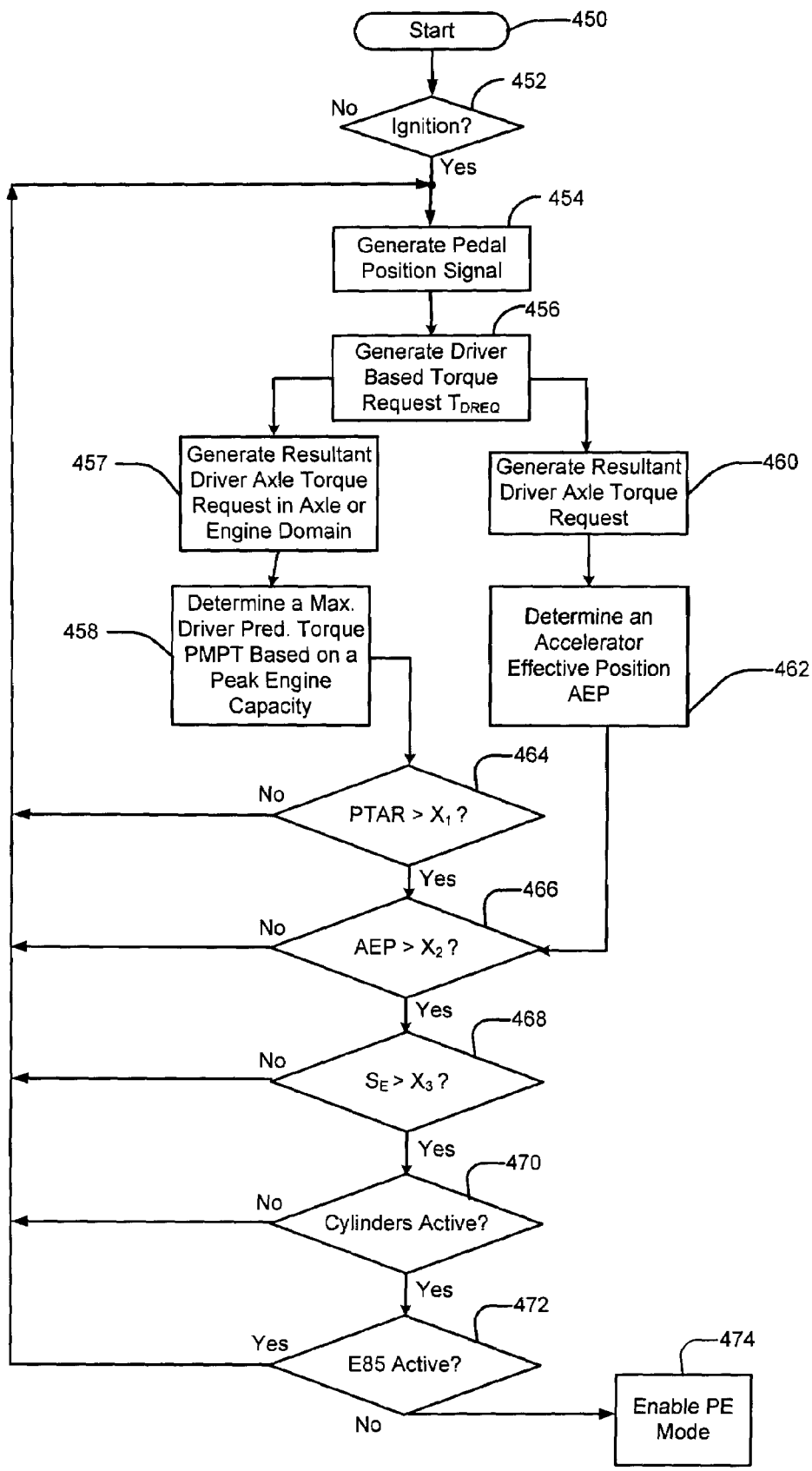
FIG. 5 illustrates a method of enabling power enrichment according to an embodiment of the present disclosure.
Figure 6:
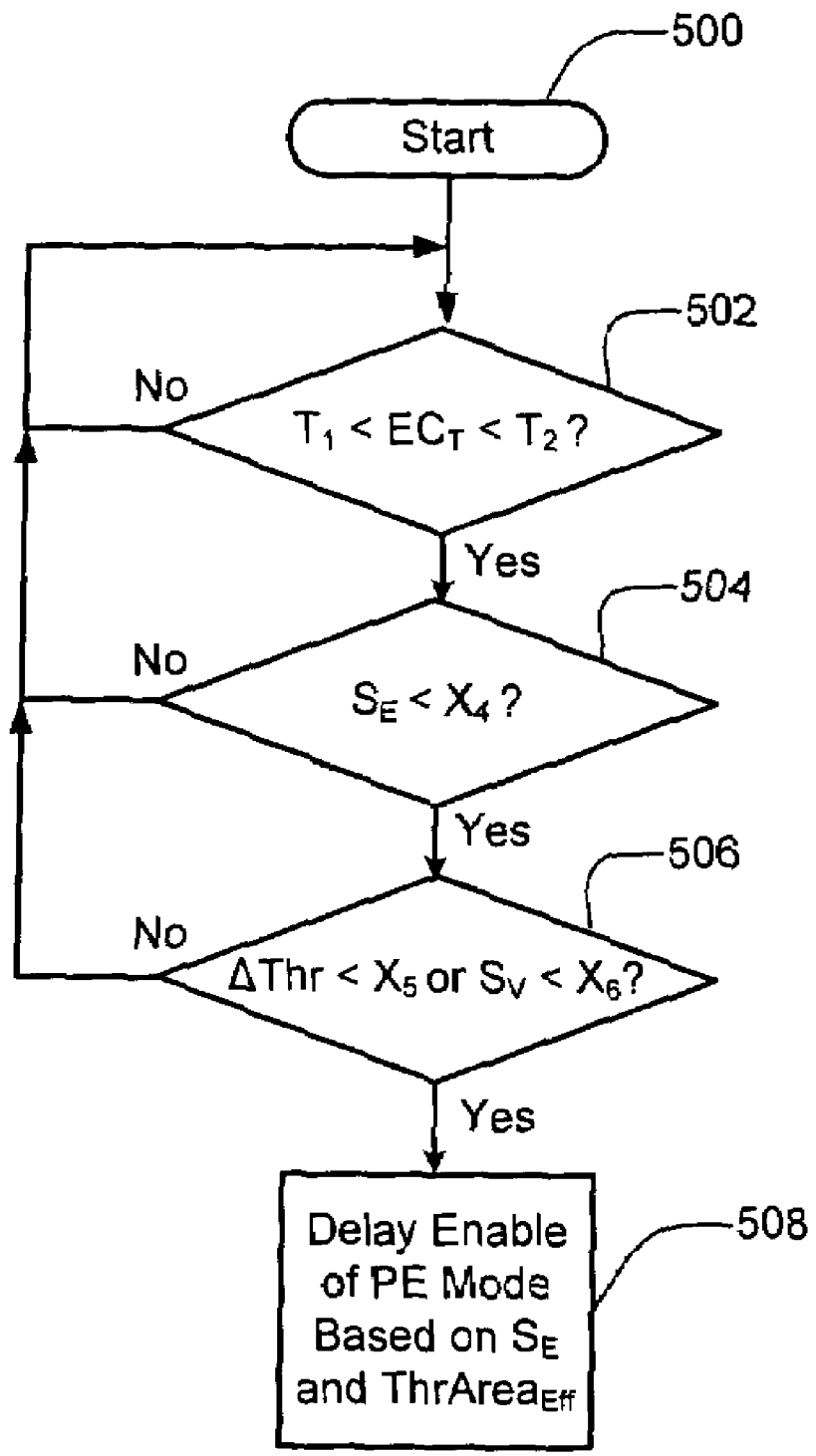
FIG. 6 illustrates a method of delaying power enrichment according to an embodiment of the present disclosure.

The following methods of FIGS. 5 and 6 may be combined and/or implemented as part of a coordinated torque control method. Coordinated torque control may be performed based on the PE enablement and/or delay provided by the methods of FIGS. 5 and 6. Although the following steps of FIGS. 5 and 6 are primarily described with respect to the embodiments of FIGS. 1-4, the steps may be easily modified to apply to other embodiments of the present disclosure.

Referring now to FIG. 5, a logic flow diagram is shown that illustrates a method of enabling power enrichment for an engine of a vehicle. Control as described with respect to steps 454-474 may be provided by one or more of the control modules described above, such as the CTC module 114 and the PE enable module 115. Control begins in step 450. In step 452, the control system determines whether the engine has been started. If true, control proceeds to step 454. If false, control returns to step 452.

In step 454, control may generate a pedal position signal, which may correspond with pedal depression by a vehicle operator. In step 456, control may generate a driver-based torque request signal $T_{DREQ}$, which is based on the pedal position of step 454. Control translates or maps the pedal position signal to the driver-based torque request signal $T_{DREQ}$.

In step 457, control arbitrates the driver-based torque request signal $T_{DREQ}$ against other axle and engine torque requests in the axle or engine domain to generate a first resultant driver axle torque request in the engine domain. The axle domain refers to an amount of torque desired at an axle of the vehicle. The engine domain refers to an amount of torque desired out of the engine of the vehicle. In other words, control determines the appropriate amount of torque desired out of the engine based on the driver-based torque request signal $T_{DREQ}$ and other torque requests, several of which are described herein.

In step 458, control determines a percent maximum driver predicted torque PMPT based on the first resultant driver axle torque request and a peak (maximum) engine torque capacity. The percent maximum driver predicted torque PMPT may be determined using equation 1. The peak engine torque capacity may be a calibration metric of the control system. For example, the maximum engine torque capacity of the engine may be determined as a result of measurements taken by an engine dynamometer.

In step 460, control arbitrates the driver-based torque request signal $T_{DREQ}$ against other driver torque requests to generate a second resultant driver axle torque request. The other driver torque requests may be associated with cruise control, PTO, and/or a speed limiter.

In step 462, control determines an accelerator effective position based on the resultant driver torque request of step 460. The accelerator effective position may be determined using equation 2. The accelerator effective pedal position may represent a pedal position. The accelerator effective pedal position may be determined and corresponding torque may be provided without actual depression of an accelerator pedal, for example, through enablement of PE.

In the following steps 464-472 control determines whether to enable PE based on the first resultant driver axle torque request, the accelerator effective position, and other criteria.

In step 464, when the maximum driver predicted torque PMPT is greater than a first threshold value $X_1$, control proceeds to step 466, otherwise control returns to step 454. In step 466, when the accelerator effective position is greater than a second threshold value $X_2$, control proceeds to step 468, otherwise control returns to step 454. In step 468, when speed of the engine $S_E$ is greater than a third threshold value $X_3$, control proceeds to step 470, otherwise control returns to step 454. In step 470, when cylinders of the engine are activated, control proceeds to step 472, otherwise control returns to step 454. In one embodiment, control proceeds to step 472 when all cylinders of the engine are activated.

In step 472, when the engine is not in an alcohol-based fuel supply mode, control proceeds to step 474, otherwise control returns to step 454. In one embodiment, an alcohol-based fuel supply mode refers to a fuel supply that has an approximately greater than 20% by volume alcohol concentration. In one embodiment, an alcohol-based fuel supply mode refers to a fuel supply that has an approximately greater than 30% by volume alcohol concentration. In one embodiment, an alcohol-based fuel supply mode refers to a fuel supply that has an approximate alcohol concentration between 70%-90% by volume. The alcohol concentration may include ethanol, denatured fuel ethanol, etc. In one embodiment, control proceeds to step 474 when the engine is not in an E85 mode. An E85 mode refers to the supplying of approximately 85% alcohol and approximately 15% hydrocarbon-based fuel, such as gasoline, by volume.

In step 474, a PE mode is enabled. When the PE mode is enabled, control signals may be generated to modify an A/F ratio of the engine to provide a richer than stoichiometric fuel equivalence ratio. For example only, control may generate fuel injector control signals, throttle control signals, valve control signals, intake and exhaust control signals, etc. to increase the amount of fuel by weight provided to the engine.

The above described method assures that when a driver requests a high level of torque or full torque, a generated arbitrated torque request, such as out of the propulsion torque arbitration request module, indicates a high percentage torque request. This high level of output torque may be provided by enabling PE. This high percentage torque request is provided to an engine torque control module, a PE control module, or some other torque control module that drives the engine to provide a high level of output torque. This occurs regardless of whether the high percentage of torque provides a decrease in fuel economy.

Conversely, when the driver requests a high level of torque or full torque and when another torque request module is requesting a reduced amount of torque, a propulsion torque arbitration request module or a PE module may not enable PE. For example, when a vehicle overspeed module requests a decrease in output torque, the propulsion torque arbitration request module may not enable PE although the driver is requesting full torque. This may also occur when the percentage maximum predicted torque indicates that torque output would not increase with enablement of PE.

Referring now to FIG. 6, a logic flow diagram is shown that illustrates a method of delaying power enrichment. The control provided in steps 500-508 may be provided by one or more of the above-described control modules, such as the CTC module 114 and the delay module 238. Control begins at step 500.

In step 502, when an engine coolant temperature is within a temperature range, such as between first and second temperatures $T_1$ and $T_2$, control proceeds to step 504, otherwise control returns to step 500. In step 504, when an engine speed $S_E$ is less than a fourth threshold $X_4$, control proceeds to step 506, otherwise control returns to step 500.

In step 506, when a change in a throttle position is less than a fifth threshold $X_5$ and/or when a vehicle speed is less than a sixth threshold $X_6$, control proceeds to step 508, otherwise control returns to step 500. In step 508, control delays enablement of a PE mode. The PE mode may be delayed based on throttle position, a throttle area, an accelerator effective position, an effective throttle area, and/or an engine speed. In one embodiment, the delay is generated based on engine speed and effective throttle area. The delay may be determined based on stored tabular values relating delay periods as a function of one or more parameters, such as throttle position, throttle area, accelerator effective position, effective throttle area, and/or engine speed.

The above-described steps of FIGS. 5 and 6 are meant to be illustrative examples; the steps may be performed sequentially, synchronously, simultaneously, continuously, during overlapping time periods or in a different order depending upon the application.

The embodiments disclosed herein schedule PE when a vehicle operator requests an increase in engine output torque. The embodiments also prevent PE from being enabled too often due to fast throttle movement at low engine speeds. The embodiments improve PE scheduling for improved fuel economy and reduced emissions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for an engine of a vehicle comprising:
a requested torque module that determines a first requested torque based on an accelerator pedal position and a current engine torque output capacity;
an accelerator effective position module that determines an accelerator effective position based on a resultant driver axle torque request signal; and
a power enrichment (PE) module that enables a PE mode to provide a richer than stoichiometric fuel equivalence ratio based on said first requested torque and said accelerator effective position.

2. The control system of claim 1 further comprising an accelerator pedal position sensor that generates said accelerator pedal position signal.

3. The control system of claim 1 wherein said overall estimated torque signal is generated based on said first requested torque and a second requested torque.

4. The control system of claim 3 wherein said second requested torque is generated by a cruise control system.

5. The control system of claim 1 wherein said accelerator effective position defines a position of a throttle that provides an output torque corresponding to said resultant driver axle torque request signal.

6. The control system of claim 1 further comprising an engine speed sensor that generates an engine speed signal,
wherein said PE module enables said richer than stoichiometric fuel equivalence ratio based on said engine speed signal.

7. The control system of claim 6 wherein said PE module enables said richer than stoichiometric fuel equivalence ratio: when said first requested torque is greater than a first threshold; when said accelerator effective position is greater than a second threshold; and when said engine speed signal is greater than a third threshold.

8. The control system of claim 1 wherein said PE module at least one of deactivates and prevents enablement of said PE mode when the engine is in a cylinder deactivation mode.

9. The control system of claim 1 wherein said PE module at least one of deactivates and prevents enablement of said PE mode when the engine is in an alcohol-based fuel supply mode.

10. The control system of claim 1 wherein said PE module delays enabling said richer than stoichiometric fuel equivalence ratio based on a coolant temperature of the engine.

11. The control system of claim 1 wherein said PE module delays enabling said richer than stoichiometric fuel equivalence ratio based on a speed of said engine.

12. The control system of claim 1 wherein said PE module delays enabling said richer than stoichiometric fuel equivalence ratio based on a change in position of a throttle of the engine.

13. The control system of claim 1 wherein said PE module delays enabling said richer than stoichiometric fuel equivalence ratio based on a speed of the vehicle.

14. The control system of claim 1 wherein said PE module delays enabling said richer than stoichiometric fuel equivalence ratio: when a coolant temperature of the engine is within a predetermined temperature range; when speed of the engine is less than a predetermined speed; and when at least one of a change in throttle position of the engine is less than a first threshold and speed of the vehicle is less than a second threshold.

15. The control system of claim 1 further comprising a coordinated torque control module that controls at least one of a camshaft phasor, an exhaust gas recirculation valve, and a turbo based on said PE mode.

16. A control system for an engine of a vehicle comprising:
a requested torque module that determines a first requested torque based on an accelerator pedal position and a current engine torque output capacity;
an accelerator effective position module that determines an accelerator effective position based on said first requested torque and a second requested torque from a cruise control system;

a power enrichment (PE) module that enables a PE mode to provide a richer than stoichiometric fuel equivalence ratio based on said first requested torque and said accelerator effective position; and a coordinated torque control module that controls operation of one or more devices including a throttle based on said accelerator effective position and a throttle position signal while in said PE mode.

17. The control system of claim 16 wherein said PE module enables said richer than stoichiometric fuel equivalence ratio: when said first requested torque is greater than a first threshold; when said accelerator effective position is greater than a second threshold; and when said engine speed signal is greater than a third threshold.

18. The control system of claim 17 wherein said PE module delays enabling said richer than stoichiometric fuel equivalence ratio: when a coolant temperature of the engine is within a predetermined temperature range; when speed of the engine is less than a predetermined speed; and when at least one of a change in throttle position of the engine is less than a first threshold and speed of the vehicle is less than a second threshold.

19. A method of operating a coordinated torque control system comprising:

determining a first requested torque based on an accelerator pedal position and a current engine torque output capacity;

determining an accelerator effective position based on a resultant driver axle torque request signal;

enabling a power enrichment (PE) mode to provide a richer than stoichiometric fuel equivalence ratio based on said first requested torque and said accelerator effective position; and providing coordinated torque control based on said enabling of said PE mode.

20. The method of claim 19 comprising enabling said richer than stoichiometric fuel equivalence ratio: when said first requested torque is greater than a first threshold; when said accelerator effective position is greater than a second threshold; and when said engine speed signal is greater than a third threshold.

* * * * *